(12) United States Patent
Farley et al.

(10) Patent No.: US 6,553,032 B1
(45) Date of Patent: Apr. 22, 2003

(54) PACKETING TIMEOUT SPOOFING IN A WIRELESS DATA COMMUNICATIONS NETWORK

(75) Inventors: Kevin L. Farley, Palm Bay, FL (US); Brian L. Kilgore, Melbourne, FL (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

(21) Appl. No.: 09/388,000

(22) Filed: Sep. 1, 1999

(51) Int. Cl.$^7$ ............................................. H04L 12/56
(52) U.S. Cl. ..................... 370/394; 370/428; 370/349; 370/236; 370/229; 714/748; 714/749
(58) Field of Search ................................ 370/394, 428, 370/236, 236.1, 349; 714/748, 749

(56) References Cited

U.S. PATENT DOCUMENTS

| | | | |
|---|---|---|---|
| 4,675,863 A | 6/1987 | Paneth et al. | 370/50 |
| 4,817,089 A | 3/1989 | Paneth et al. | 370/95 |
| 4,912,705 A | 3/1990 | Paneth et al. | 370/95.1 |
| 5,325,419 A | 6/1994 | Connolly et al. | 379/60 |
| 5,412,429 A | 5/1995 | Glover | 348/398 |
| 5,585,850 A | 12/1996 | Schwaller | 348/388 |
| 5,617,423 A | 4/1997 | Li et al. | 370/426 |
| 5,655,001 A | 8/1997 | Cline et al. | 370/328 |
| 5,657,358 A | 8/1997 | Paneth et al. | 375/356 |
| 5,687,194 A | 11/1997 | Paneth et al. | 375/283 |
| 5,697,059 A | 12/1997 | Carney | 455/34.1 |
| 5,974,028 A | * 10/1999 | Ramakrishnan | 370/229 |
| 6,298,041 B1 | * 10/2001 | Packer | 370/231 |

FOREIGN PATENT DOCUMENTS

| | | |
|---|---|---|
| EP | 0 526 106 A2 | 2/1993 |
| EP | 0 682 423 A2 | 11/1995 |
| EP | 0 719 062 A2 | 6/1996 |
| WO | WO 96/08934 | 3/1996 |
| WO | WO 96/37081 | 11/1996 |
| WO | WO 98/37670 | 8/1998 |

OTHER PUBLICATIONS

Melanchuk, et al., "CDPD and Emerging Digital Cellular Systems," *Digest of Papers of Compcon*, Computer Society Conference 1996, Technologies for the Information Superhighway, Santa Clara, CA., no. Conf. 41, pp. 2–8 (Feb. 25, 1996), XP000628458 Institute of Electrical and Electronics Engineers.

Jorge A. Cobb, et. al., "*Congestion of Corruption? A Strategy for Efficient Wireless TCP Sessions*," Proceedings IEEE Symposium on Computers and Communications pp. 262–268 XP000568953 (1995).

Elan Amir, et. al., "*Efficient TCP over Networks with Wireless Links*," Fifth Workshop on Hot Topics in Operating Systems pp. 35–40 XP002150718 (May 4–5, 1995).

Hari Balakrishnan, et. al, "*Improving Reliable Transport and Handoff Performance in Cellular Wireless Networks*," ACM Mobile Computing and Network Conference pp. 1–19, XP002150717 (Nov. 14–15, 1995).

* cited by examiner

*Primary Examiner*—Daniel Hunter
*Assistant Examiner*—Alan T. Gantt
(74) *Attorney, Agent, or Firm*—Hamilton, Brook, Smith & Reynolds, P.C.

(57) ABSTRACT

Method and apparatus are provided to prevent unneccessary execution of TCP/IP performance enhancing algorithms in a wireless communications network. The method includes monitoring acknowledgment message traffic between a sending unit and a receiving unit and preventing forwarding of an acknowledgment message to the sending unit when the acknowledgment message is a second duplicate acknowledgment message. The apparatus includes a first endpoint unit connected between a sending unit and a receiving unit. The first endpoint unit includes a monitor component to monitor acknowledgment message traffic between the sending unit and the receiving unit and a filter unit to prevent forwarding of a duplicate acknowledgment message to the sending unit until a predefined condition is met.

14 Claims, 6 Drawing Sheets

PACKETING TIMEOUT SPOOFING IN A WIRELESS DATA COMMUNICATIONS NETWORK

BACKGROUND OF THE INVENTION

The widespread availability of personal computers at low cost has lead to a situation where the general public increasingly demands access to the Internet and other computer networks. A similar demand exists for wireless communications in that the public increasingly demands that cellular telephones be available at low cost with ubiquitous coverage.

As a result of their familiarity with these two technologies, the general population now increasingly wishes to not only have access to computer networks, but also wishes to access such networks in wireless fashion as well. This is of particular concern for the users of portable computers, laptop computers, hand-held personal digital assistants (PDAs), and the like, who would prefer and, indeed, now expect to be able to access such networks with the same convenience they have grown accustom to when using their cellular telephones.

Unfortunately, there is still no widely available satisfactory solution for providing low cost, high speed access to the Internet and other networks using the existing wireless infrastructure which has been built at some expense to support cellular telephony. Indeed, at the present time, the users of wireless modems that operate with the existing cellular telephone network often experience a difficult time when trying to, for example, use the Internet to view web pages. The same frustration level is felt in any situation when attempting to perform other tasks that require the transfer of relatively large amounts of data between computers.

This is, at least, in part due to the architecture of cellular telephone networks, which were originally designed to support voice communications, as compared to the communication protocols in use for the Internet, which were originally optimized for wireline communication. In particular, the protocols used for connecting computers over wireline networks do not lend themselves well to efficient transmission over standard wireless connections.

For example, cellular networks were originally designed to deliver voice grade services, having an information bandwidth of approximately three kilohertz (kHz). While techniques exist for communicating data over such radio channels at rate of 9600 kilo bits per second (kbps), such low frequency channels do not lend themselves directly to transmitting data at rates of 28.8 kbps or even the 56.6 kbps that is now commonly available using inexpensive wireline modems. These rate are presently thought to be the minimum acceptable data rates for Internet access.

This situation is true for advanced digital wireless communication protocols as well, such as Code Division Multiple Access (CDMA). Even though such systems convert input voice information to digital signals, they were also designed to provide communication channels at voice grade bandwidth. As a result, they have been designed to use communication channels that may exhibit a bit error rate (BER) of as high as approximately one in one thousand bits in multipath fading environments. While such a bit error rate is perfectly acceptable for the transmission of voice signals, it becomes cumbersome for most data transmission environments.

Such a high bit error rate is certainly unacceptable for Internet type data transmissions. For example, the Transmission Control Protocol/Internet Protocol (TCP/IP) standard in use for Internet air transmission uses a frame size of 1480 bits. Thus, if a bit error is received in every frame, such as detected by a frame check sequence, it would appear as though every single frame might have to be re-transmitted in certain applications.

SUMMARY OF THE INVENTION

One method of providing an error-free channel over a wireless communication network entails an intermediary base unit resending an individual packet over the wireless connection until the packet is received correctly. If the wireless connection experiences interference or is operating under poor signal-to-noise ratio conditions, multiple resends may be required to achieve an error free transmission. As a result, a non-deterministic delay is introduced into the system.

The TCP/IP standard however, does not account for such non-deterministic delays and therefore assumes an error has occurred in the transmission. The TCP/IP standard includes various algorithms which are automatically invoked in such cases. One such algorithm, a performance enhancing algorithm described in Request For Comments (RFC) 2001, retransmits a packet if three acknowledgments are received which identify the same packet as being a next expected packet.

By way of background, a TCP/IP network may operate under a sliding window protocol in an effort to provide reliable stream delivery while maximizing bandwidth. Under this protocol, both endpoints of a TCP/IP connection negotiate an acceptable window size. The window size designates a maximum number of bytes which may be transmitted by a sending unit before receiving an acknowledgment from the receiving unit. Generally, the window is referred to in terms of maximum number of unacknowledged packets. Once the sending unit receives an acknowledgment for the first packet in the window, it "slides" the window along and sends the next packet.

TCP/IP acknowledgments are cumulative. That is, they refer to a position in the stream of data up to which, the data has been received. Moreover, the acknowledgment specifies a sequence number of the next byte or octet that the receiver expects to receive. As a result, the sending unit is informed of the longest contiguous prefix of the stream that has been received correctly. No information, however, is provided with regard to other packets which were transmitted successfully but, were received out of order.

That is, in a stream of data comprising packet numbers 1–15, where a window consists of ten packets, if packets 1–5 and 7–15 have been received successfully, each acknowledgment sent for a packet received after packets 1–5 have been received, specifies that packet 6, the next highest contiguous packet, is expected. Once three acknowledgments requesting packet 6 have been sent, the RFC 2001 performance enhancing algorithm is invoked and packets 6–15 are resent by the sending unit even though packets 7–15 have been successfully received by the receiving unit.

In a wireless TCP/IP connection, a failure to receive a packet may not be an indication of a problem in a system but rather, as described above, a delay caused by an effort to send an error free packet. As a result, additional bandwidth is used to needlessly resend packets which have either already been received but not acknowledged or are currently being transmitted with some additional delay.

In accordance with one aspect of the invention, a method for avoiding a packet resend in a wireless data communications network is provided that includes monitoring acknowledgment message traffic between a sending unit and a receiving unit and preventing forwarding of an acknowledgment message to the sending unit when the acknowledgment message is a second duplicate acknowledgment message. With such an arrangement, non-deterministic delays introduced into a wireless communications network do not needlessly cause packet resends.

In accordance with a further aspect of the invention, an apparatus is provided for avoiding a packet resend in a wireless data communications network. The apparatus includes a first endpoint unit connected between a sending unit and a receiving unit. The first endpoint unit includes a monitor component to monitor acknowledgment message traffic between the sending unit and the receiving unit and a filter unit to prevent forwarding of a duplicate acknowledgment message to the sending unit until a predefined condition is met. With such an arrangement, resends of packets previously received at a receiving unit may be avoided.

In accordance with a further aspect of the invention a method is provided for providing packet receipt acknowledgment in a wireless data communications network. The method includes sending an acknowledgment message from a receiving unit to an endpoint unit to acknowledge receipt of a data packet, forwarding the acknowledgment message, from the endpoint unit, to a sending unit if the acknowledgment message is not a duplicate acknowledgment message and preventing forwarding of the acknowledgment message to the sending unit if the acknowledgment message is a second duplicate acknowledgment message.

Also provided is a computer program product for avoiding a packet resend in a wireless data communications network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
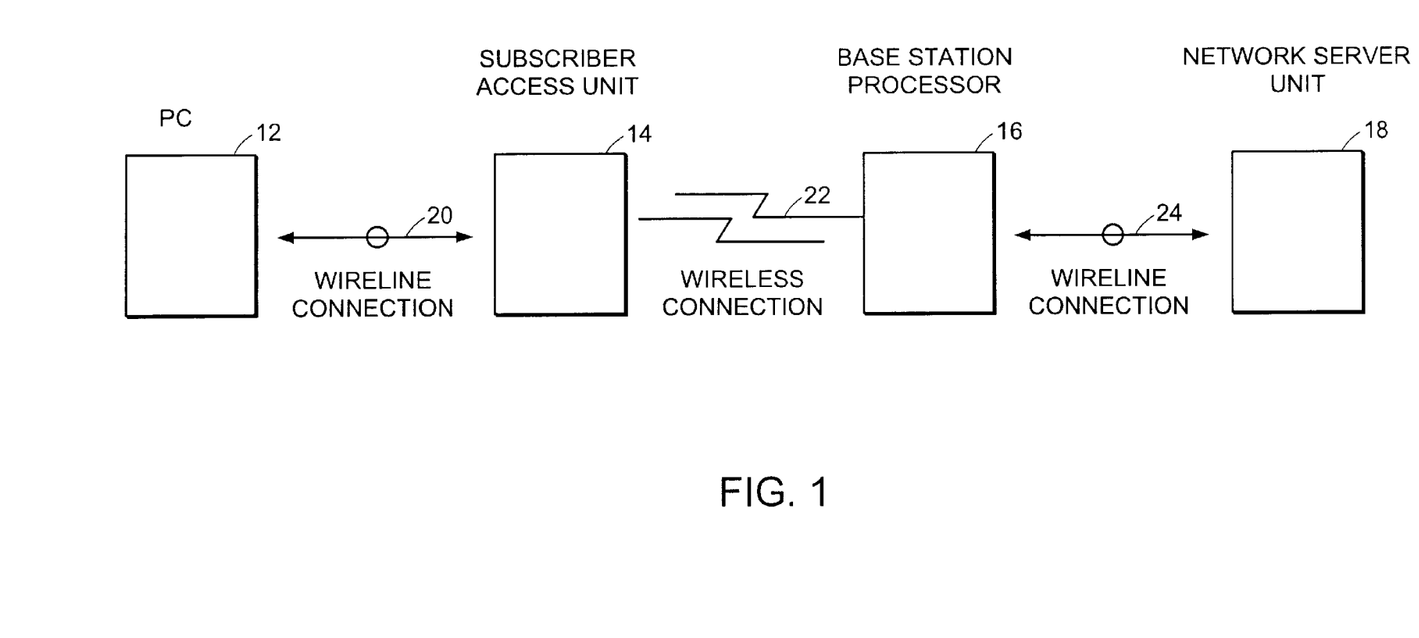
FIG. 1 is a block diagram of a communication system suitable for performing packeting timeout spoofing in a wireless communications network.

FIG. 1 is a block diagram of a communication system 10 suitable for performing packeting timeout spoofing in a wireless communications network. The communication system 10 is shown to include a personal computer (PC) 12, a subscriber access unit (SAU) 14, a base station processor (BSP) 16 and a network server unit (NSU) 18. The SAU 14 connects to the BSP 16 through a wireless connection 22. The BSP 16 connects to the NSU 18 through a wireline connection 24. The PC 12, which may, alternatively, be a personal digital assistant (PDA) or the like (not shown), connects to the SAU 14 through a wireline connection 20.

As shown, the PC 12 may be provided access to the NSU 18, which may be any remote entity located on the Internet or other network, through a combination of the wireline 20,24 and wireless 22 bidirectional connections provided. Typically, the PC 12 provides an Internet Protocol (IP) packet to the SAU 14 over the wireline connection 20. The SAU 14 removes the wireline framing of the IP packet and transfers the data in the IP packet to the BSP 16, over the wireless connection 22 in accordance with a radio link protocol. The BSP 16 extracts the radio link frames and forwards them, in IP packet form, over the wireline connection 24 to the NSU 18. The SAU 14 and the BSP 16 may be viewed as endpoints on the wireless connection 20.

Once the connections are established, a user at the PC 12 and the NSU 16 may share data. In accordance with the TCP/IP protocol, a receiving unit sends an acknowledgment message to a sending unit upon receipt of a sent packet of data. In addition, where a sliding window protocol is followed, a limit is placed on a maximum number of outstanding packets allowed in the system. In accordance with the sliding window protocol, once the maximum number of outstanding, unacknowledged packets have been sent, the sending unit stops sending packets until an acknowledgment is received. The receiving unit may provide cumulative acknowledgment messages which indicate a number of consecutive packets which have been received.

Here, data packets, as well as acknowledgment messages, are forwarded by the endpoints of the wireless connection 22, the SAU 14 and the BSP 16, to the appropriate units in the manner described above. The acknowledgment message includes a sequence number for a next expected packet of data.

Under certain circumstances, delays may be introduced into the system resulting in the receiving unit not receiving a packet within an allotted period of time. Consequently, multiple acknowledgment messages may be sent, each indicating an expectation by the receiving unit of receiving the delayed packet next. It should be noted that, as described above, an acknowledgment message is cumulative, indicating the sequence number for the next expected packet of data. That is, an acknowledgment message, resulting from receipt of a packet, indicates the identity of a next expected packet, rather than indicating an identity of the packet received. To more fully illustrate the cumulative nature of acknowledgment messages, FIG. 2 is provided.

Figure 2:
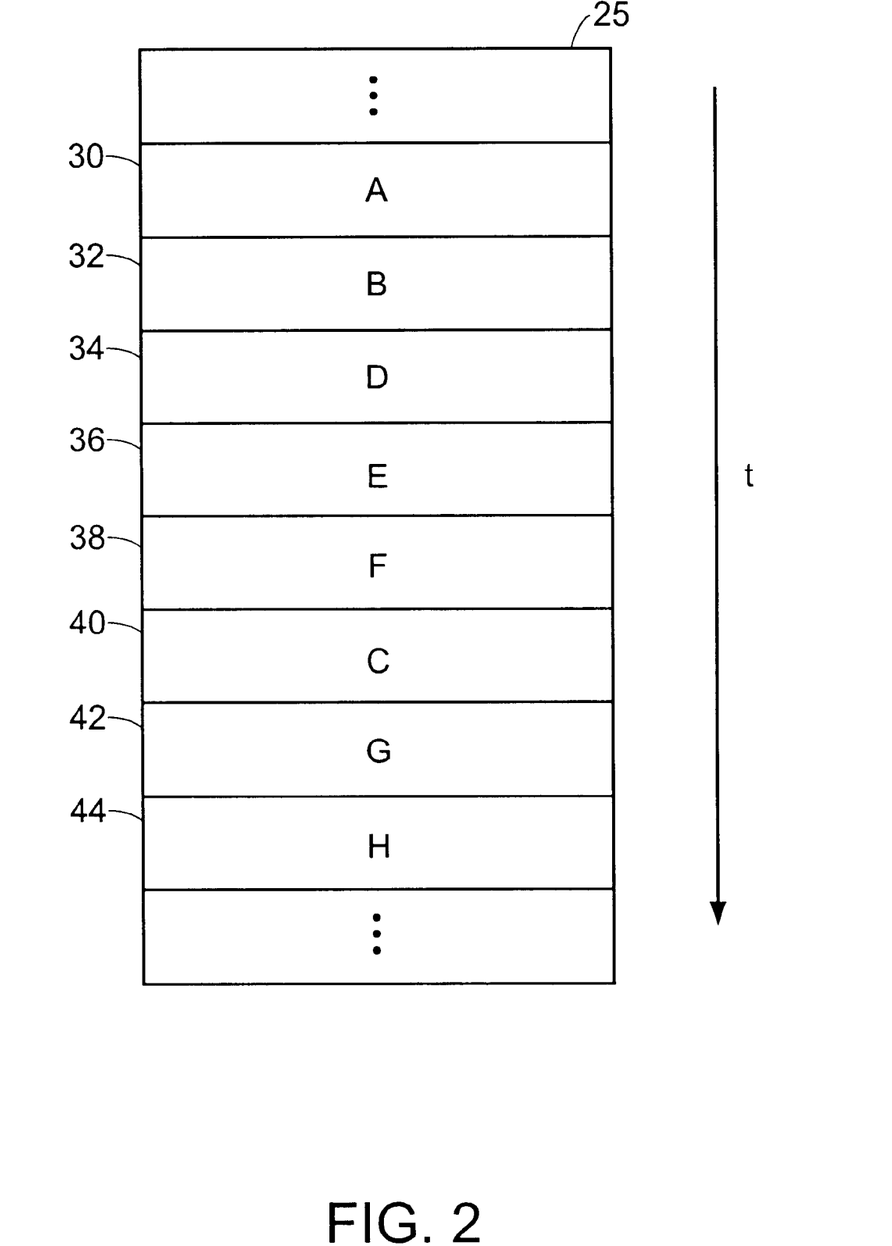
FIG. 2 is a diagram indicating a receipt order of packets at a receiving unit.

FIG. 2 is a diagram 25 indicating a receipt order of packets at a receiving unit. As shown, packets D 34, E 36 and F 38 were received by the receiving unit prior to receipt of packet C 40. Specifically, packets A 30 and B 32 were received, followed by packets D 34, E 36 and F 38. Following receipt of packet F 38, packets C 40, G 42 and H 44 were received in that order.

In response to the receipt of each of these packets, the receiving unit sends an acknowledgment message to the sending unit to indicate receipt of a packet. As described above, each acknowledgment message indicates to the sending unit, a sequence number of the next expected packet.

Here, upon receipt of packet A 30, the receiving unit sends an acknowledgment message indicating that the next packet expected is packet B 32. Upon receipt of packet B 32, packet C 40 is indicated in the acknowledgment message as the next message expected by the receiving unit. The receiving unit next receives packet D 34. Rather than indicating receipt of packet D 34 specifically, the acknowledgment message indicates in the acknowledgment message that the receiving unit is expecting packet C 40 next. Hence, the acknowledgment message indicates a point in the sequence of packets, before which the receiving unit has received all packets, and after which at least the next sequential packet has not been received.

The acknowledgment messages after receipt of packets E 36 and F 38 also indicate that packet C 40 is expected next. Upon receipt of packet C 40 however, the resulting acknowledgment message indicates that packet G 42 is the next expected packet thus illustrating the cumulative nature of the acknowledgment messages.

As a result of such duplicate acknowledgment messages, the communication system 10, assuming congestion in the system 10 or, perhaps, as a means of improving the performance of the system 10, may invoke certain algorithms which prompt the sending unit to retransmit an unacknowledged packet. Typically, these packet retransmits resend not only the delayed packet, but also each subsequent packet which may have been received by the sending unit, however, remain unacknowledged due to the intervening delayed packet. Using the scenario illustrated in FIG. 2, after the sending unit received the duplicate acknowledgment messages sent in response to receipt of packets D 34, E 36 and F 38, the sending unit would be prompted to retransmit the delayed packet C 40 as well as packets D–H even though packets D 34, E 36 and F 38 were already received. Typically, a retransmit takes place after the sending unit receives a third identical (second duplicate) acknowledgment message.

In an effort to reduce this retransmission traffic in the communications system, a solution is provided in which the endpoints of the wireless connection 22, the SAU 14 and the BSP 16, delay forwarding of the second duplicate acknowledgment message. For ease and clarity of explanation, FIGS. 3 and 4 will be described assuming that the PC 12 is the receiving unit and the NSU 18 is the sending unit. The functionality for delaying forwarding of the second duplicate acknowledgment message will be described as residing in the SAU 14. It should be apparent to one of skill in the art, however, that such functionality may reside in either or both endpoints of the. wireless connection 22.

Figure 3:
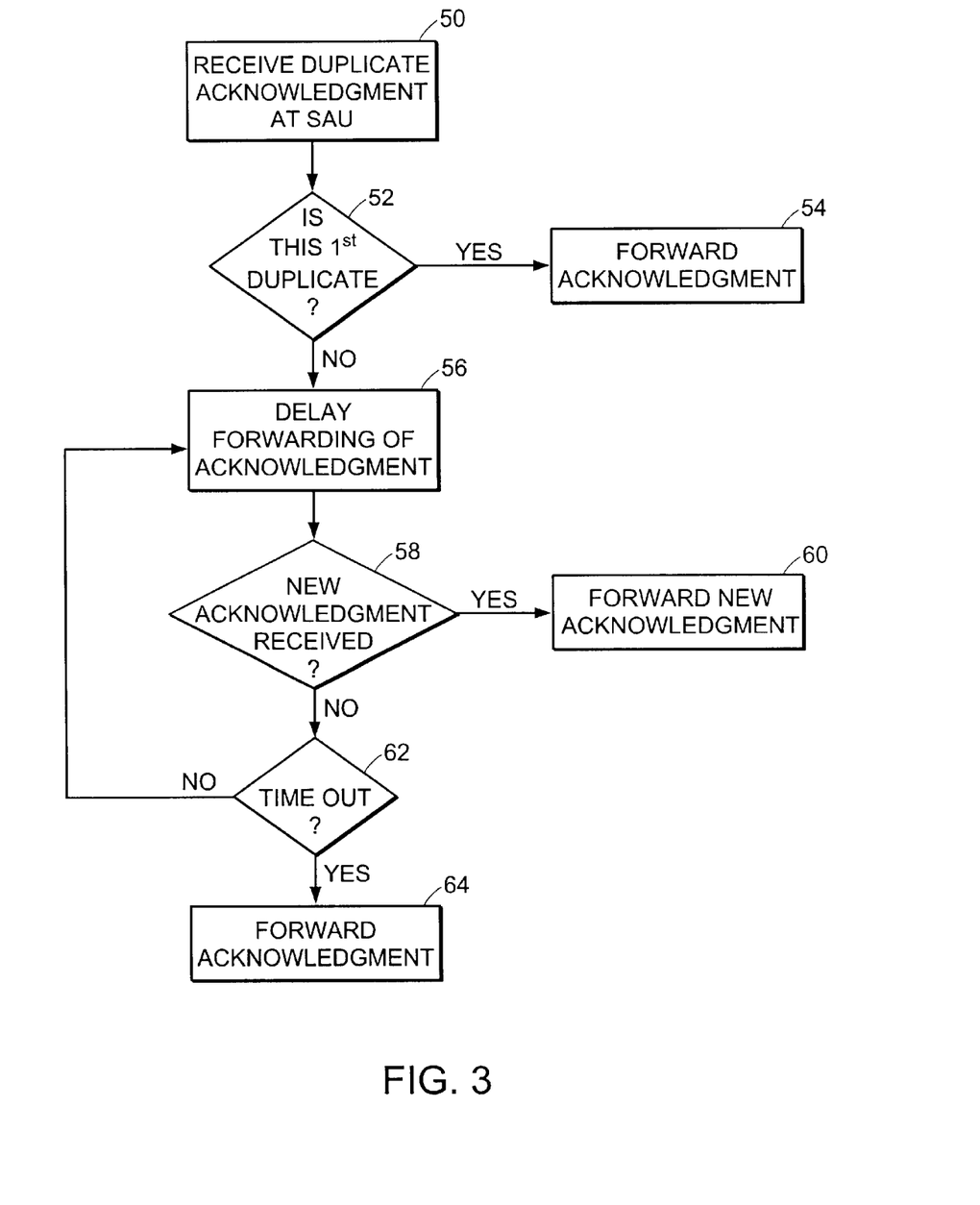
FIG. 3 is a flow diagram depicting a procedure invoked upon receipt by the subscriber access unit of FIG. 1 of a duplicate acknowledgment message.

FIG. 3 is a flow diagram depicting a procedure invoked upon receipt by the subscriber access unit of FIG. 1 of a duplicate acknowledgment message. At step 50, the SAU 14 (FIG. 1) receives a duplicate acknowledgment. As is known in the art, a TCP/IP acknowledgment message includes a sequence number for the next expected packet. A duplicate acknowledgment message, therefore, includes a sequence number for the same expected packet as was included in the previous acknowledgment message.

If, at step 52 it is determined that this is a first duplicate acknowledgment message, the SAU 14 forwards the acknowledgment message to the sending unit at step 54. If it is determined to be a second duplicate or higher at step 52, the SAU 14 delays forwarding of the acknowledgment message at step 56.

At step 58, a check is made to determine whether a new acknowledgment has been received. A new acknowledgment includes a new sequence number for a next expected packet thus indicating that the prior packet the receiving unit was waiting for was received. If no new acknowledgment has been received however, the SAU 14 determines whether a time limit has elapsed at step 62. If there has been a time out, the previously delayed acknowledgment is forwarded to the sending unit at step 64. If the time limit has not expired, however, the SAU 14 continues to delay forwarding of the acknowledgment message until either a new acknowledgment message is received or the time limit has expired.

Figure 4:
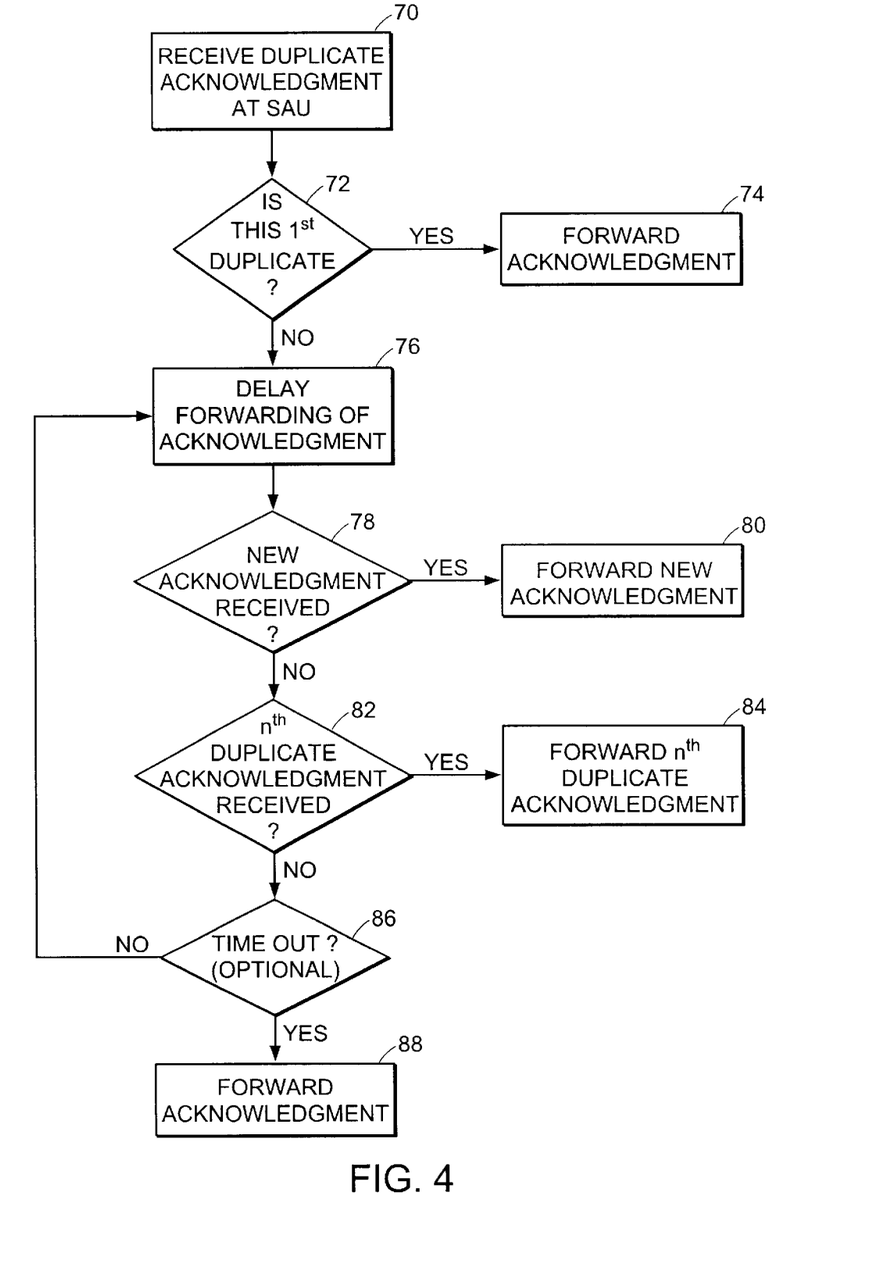
FIG. 4 is a flow diagram depicting an alternate embodiment of a procedure invoked upon receipt by the subscriber access unit of FIG. 1 of a duplicate acknowledgment message.

FIG. 4 is a flow diagram depicting an alternate embodiment of a procedure invoked upon receipt by the subscriber access unit of FIG. 1 of a duplicate acknowledgment message. A duplicate acknowledgment message is received by the SAU 14 at step 70. If at step 72 it is determined that this is the first duplicate acknowledgment message it is forwarded by the SAU 14 to the sending unit. If however this is not the $1^{st}$ duplicate acknowledgment message the SAU 14 delays forwarding of the acknowledgment at step 76.

At step 78, if a new acknowledgment message is received, it is forwarded to the sending unit by the SAU 14 at step 80. If no new acknowledgment is received but rather, a fourth duplicate acknowledgment message is received at step 82, it is forwarded by the SAU 14 at step 84. Here, a fourth duplicate acknowledgment message is furnished to the sending unit automatically. Depending upon the specifics of the wireless connection within the communications network however, it may be advantageous to automatically forward any one of a fourth through a tenth duplicate acknowledgment message.

Because communication system 10 is operating under a windowing protocol, a time limit may optionally be checked at step 86 to determine whether, if it has expired, the acknowledgment message should be forwarded at step 86. If the time limit has not been exceeded, or the time limit option is not utilized, the SAU 14 continues to delay forwarding of the acknowledgment message until a new acknowledgment message or the fourth duplicate acknowledgment message is received.

Figure 5A:
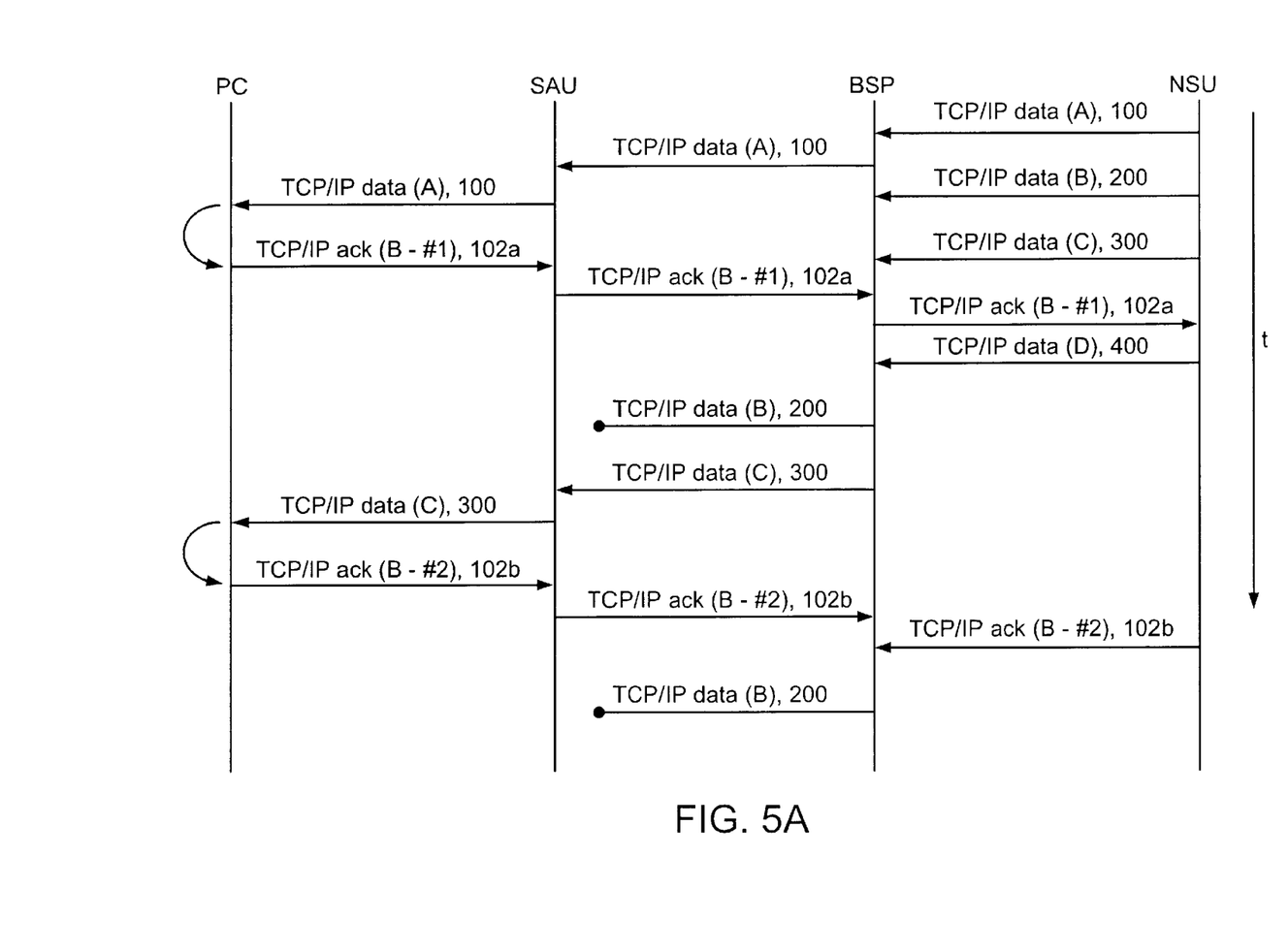
FIG. 5A is a message sequence chart illustrating a packet data and acknowledgment message exchange between a network server unit and a personal computer through the subscriber access unit and the base station processor of FIG. 1.
Figure 5B:
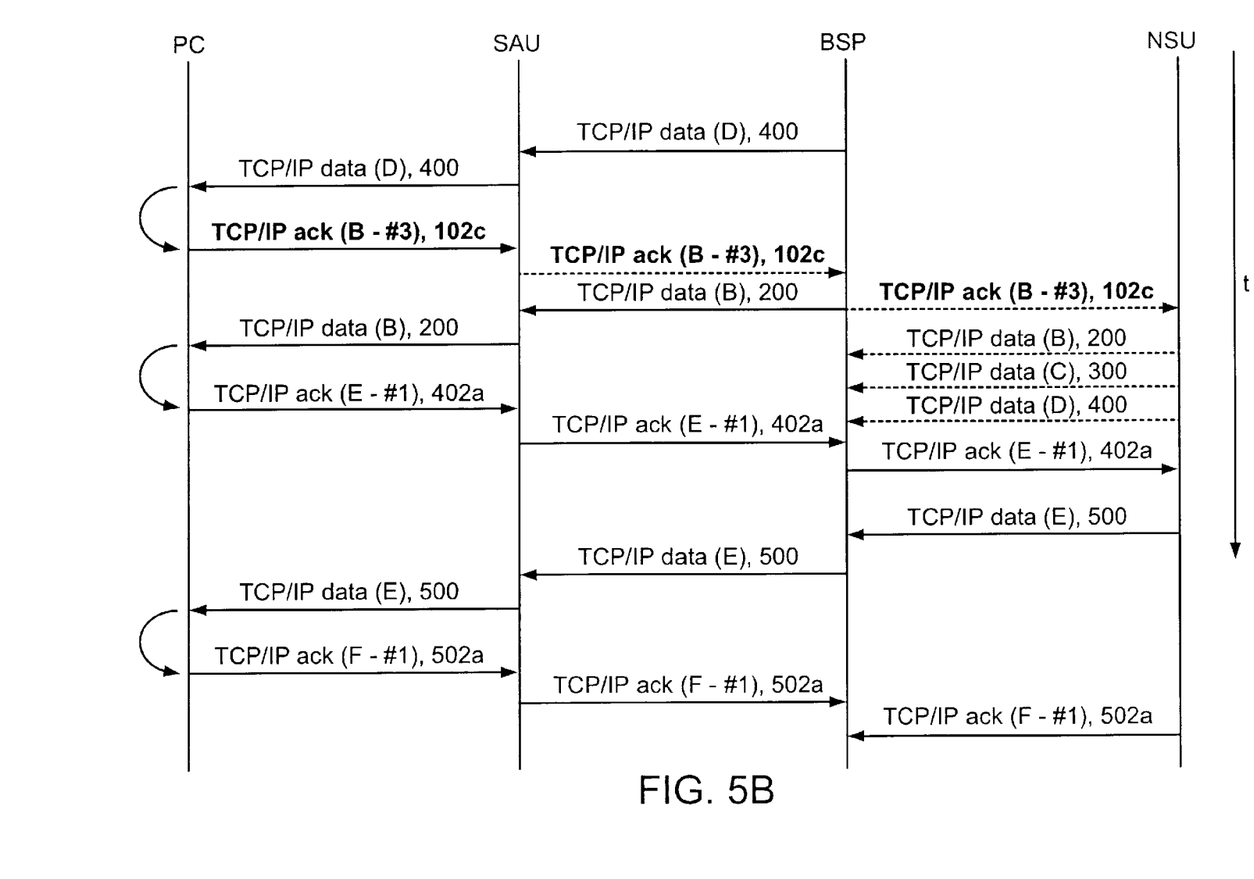
FIG. 5B is a continuation of the chart of FIG. 5A.

FIGS. 5A and 5B depict a message sequence chart illustrating a data packet and acknowledgment message exchange between a network server unit and a personal computer, through the subscriber access unit and the base station processor of FIG. 1. For illustrative purposes, acknowledgment messages are shown being provided in response to receipt of each data packet at the receiving unit. It should be noted however, that acknowledgment messages may also be provided to acknowledge receipt of every two or more data packets.

Here, the NSU 18 sends a TCP/IP data packet A 100 to the BSP 16 over wireline connection 24. The BSP 16 forwards packet A 100 to the SAU 14 over the wireless connection 22. Finally, the SAU 14 forwards packet A 100 to the PC 12 over wireline connection 20.

In accordance with the TCP protocol, the PC 12, in receipt of packet A 100, sends an acknowledgment message B 102a to the sending unit, NSU 18. The acknowledgment message B 102a indicates the next packet the receiving unit, PC 12, expects to receive, packet B. The notation "#1" within the acknowledgment message 102a signifies that this is the first acknowledgment message indicating packet B which has been sent by the PC 12. This notation "#1" is included for illustrative purpose only, and typically is not an element of the acknowledgment message 102a.

The SAU 14 receives the first acknowledgment message B 102a and, determining that it is not a duplicate acknowledgment message, forwards it over the wireless connection 22 to the BSP 16. The BSP 16 forwards the first acknowledgment message B 102a to the NSU 18 over the wireline connection 24.

Prior to receiving the first acknowledgment message B 102a, the NSU 18 sends two additional data packets, packet B 200 and packet C 300 to PC 12 over the wireline connection 24. These packets are not immediately forwarded to the PC 12 by the BSP 16 but rather, are buffered to be sent at a later time. After receiving the first acknowledgment message B 102a, the NSU 18 also sends data packet D 400.

Subsequently, the BSP 16 attempts to forward data packet B 200 across the wireless connection 22. Packet B 200 however, is not received by the SAU 14. Due to the nature of wireless connections, packets may be resent over the wireless connection a number of times before an error-free packet is received at the reciprocal endpoint of the wireless connection. Wireless connections, traditionally, do not operate at the low bit error rate required of a TCP/IP connection and thus, to provide an error free channel, resends of packets may occasionally be executed.

The BSP 16 then forwards data packet C 300 to the SAU 14 over the wireless connection 22. The SAU 14, in turn, forwards packet C 300 to the PC 12. The PC 12 responds to the receipt of packet C 300 with a second acknowledgment message B 102b. The second acknowledgment message B indicates to the sending unit, the NSU 18, that the PC 12 received a packet and that it is next expecting to receive packet B. No acknowledgment is provided to the NSU 18 to indicate specifically that packet C 300 was received.

The SAU 14 determines that, although this is a duplicate acknowledgment message, it is the first duplicate and forwards the second acknowledgment message B 102b over the wireless connection 22 to the BSP 16. The BSP 16 forwards the second acknowledgment B 102b to the NSU 18 and again, attempts to forward packet B 200 over the wireless connection 22. Again, packet B 200 fails to arrive at the SAU 14.

Referring now to FIG. 5B, the message sequence chart of FIG. 5A continues with the BSP 16 forwarding packet D 400 to the SAU 14. SAU 14 forwards packet D 400 to the PC 12. The PC 12, in receipt of packet D 400, sends a third acknowledgment message B 102c over the wireline connection 20 to the SAU 14.

Here, the SAU 14 determines that the third acknowledgment message B 102c is a duplicate acknowledgment message and, is not the first duplicate message. Accordingly, the SAU 14 delays forwarding of the third acknowledgment message B 102c to the BSP 16.

Here, for illustrative purposes, the consequences of forwarding the third acknowledgment message B 102c is shown in phantom. Once the BSP 16 receives the third acknowledgment message B 102c it is forwarded to the NSU 18. The NSU 18, receiving a third, identical acknowledgment message B 102c is prompted to resend the unacknowledged packet and all other packets within the same window to the receiving unit, the PC 12, by a performance enhancing algorithm. For ease and clarity of description, it will be assumed that a three packet window is supported within the communication system 10. Accordingly, data packets B 200, C 300 and D 400 are resent to the BSP 16 and will, eventually, be resent to the PC 12 even though both packet C 300 and D 400 had been previously received successfully by the PC 12. Consequently, bandwidth on the wireless connection 22 would be needlessly consumed by the resend.

Returning to the actual message sequence of FIG. 5B, BSP 16 again attempts to forward packet B 200 over the wireless connection 22, this time successfully. The SAU 14 forwards packet B 200 to the PC 12. After receipt of packet B 200, the PC formulates an acknowledgment message E 402a which indicates that packet E is now the next expected packet to be received by the PC 12. Packet E is designated in the acknowledgment message E 402a since packets C 300 and D 400 were previously received by the PC 12 and therefore, packet E indicates the location in the data stream up to which, the PC 12 has received successfully.

The SAU 14 determines that the acknowledgment message E 402a is not a duplicate acknowledgment message and forwards it over the wireless connection 22 to the BSP 16 which forwards the acknowledgment message E 402a to the NSU 18. The NSU 18 subsequently sends data packet E 500 to the BSP 16 which is forwarded over the wireless 22 and wireline 20 connections to the PC 12. The PC 12, in receipt of packet E responds with acknowledgment message F 502a which is forwarded by the endpoints of the wireless connection 22, SAU 14 and BSP 16, to the NSU 18.

EQUIVALENTS

It should be noted that the methods described above may also be used in systems that experience a non-deterministic delay such as so-called "long" and "fat" networks and satellite networks. "Long" networks are those networks which span over long distances and experience delays in packet transmissions due to the distances over which the packets are transmitted. "Fat" networks are networks which extend over relatively short distances however have additional delay introduced as a result of the additional packet transmission traffic experienced.

It will be apparent to those of ordinary skill in the art that methods involved in A Packeting Timeout Spoofing in a Wireless Data Communications Network may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. An apparatus for avoiding a packet resend in a wireless data communications network, comprising:

a first endpoint unit connected between a sending unit and a receiving unit;

the first endpoint unit further comprising:

a monitor component to monitor acknowledgment message traffic between the sending unit and the receiving unit; and a filter unit to prevent forwarding of a duplicate acknowledgment message to the sending unit until a predefined condition is met, wherein the first endpoint unit is subscriber access unit.

2. The apparatus of claim 1 wherein the predefined condition is expiration of a time limit.

3. The apparatus of claim 1 wherein the predefined condition is that the duplicate acknowledgment message is an xth duplicate acknowledgment message.

4. The apparatus of claim 3 wherein x equals 4.

5. The apparatus of claim 1 wherein the first endpoint unit is connected to the sending unit through a wireless connection.

6. The apparatus of claim 1 wherein the first endpoint unit is connected to the receiving unit through a wireless connection.

7. The apparatus of claim 1 wherein the first endpoint unit is a wireless base station processor.

8. An apparatus for avoiding a packet resend in a wireless data communications network, the apparatus comprising:

a first endpoint unit connected between a sending unit and a receiving unit;

the first endpoint unit further comprising:

a monitor component to monitor acknowledgment message traffic between the sending unit and the receiving unit; and a filter unit to prevent forwarding of a duplicate acknowledgment message to the sending unit until a predefined condition is met; and a second endpoint unit connected between the sending unit and the receiving unit;

the second endpoint unit further comprising:

a monitor component to monitor acknowledgment message traffic between the sending unit and the receiving unit; and a filter unit to prevent forwarding of a duplicate acknowledgment message to the sending unit until a predefined condition is met.

9. The apparatus of claim 8 wherein the predefined condition is expiration of a time limit.

10. The apparatus of claim 8 wherein the predefined condition is that the duplicate acknowledgment message is an xth duplicate acknowledgment message.

11. The apparatus of claim 10 wherein x equals 4.

12. The apparatus of claim 8 wherein the first endpoint unit is connected to the sending unit through a wireless connection.

13. The apparatus of claim 8 wherein the first endpoint unit is connected to the receiving unit through a wireless connection.

14. The apparatus of claim 8 wherein the first endpoint unit is a wireless base station processor.

* * * * *